APPARATUS FOR THE AERATION OF LIQUIDS

Original Filed Dec. 12, 1961 2 Sheets-Sheet 1

INVENTORS
CHARLES RIGHTON ALSOP
ROBERT MORRISON SEMPLE
Norris & Bateman
ATTORNEYS

APPARATUS FOR THE AERATION OF LIQUIDS

Original Filed Dec. 12, 1961 2 Sheets-Sheet 2

INVENTORS
CHARLES RIGHTON ALSOP
ROBERT MORRISON SEMPLE

United States Patent Office

Re. 26,194
Reissued Apr. 18, 1967

26,194
APPARATUS FOR THE AERATION OF LIQUIDS

Charles Righton Alsop, Heald Green, Cheadle, and Robert Morrison Semple, Cheadle Hulme, England, assignors to Simon-Carves Limited, Stockport, England, a British company Original No. 3,182,972, dated May 11, 1965, Ser. No. 158,672, Dec. 12, 1961. Application for reissue Feb. 10, 1966, Ser. No. 532,510
9 Claims. (Cl. 259—107)

Matter enclosed in heavy brackets [ ] appears in the original patent but forms no part of this reissue specification; matter printed in italics indicates the additions made by reissue.

This invention relates to the aeration of liquids and in particular to a form of agitator or impeller whereby an aerating turbulence may be given to a body of liquid in a container without the necessity for any fixed or moving parts to be secured to the container below the surface of the liquid.

One particular feature of the invention is the economy it permits in the motive force required to cause it to perform its functions; this being due to the fact that efficient aeration can be obtained by its use without it being necessary for the aerating action to raise the liquid substantially above the normal level of the liquid in the container. It is thus possible also to economize in the size of the container, which does not require to be continued to any appreciable height above the liquid level as, due to the flat trajectory of the liquid displaced by rotation of the agitator, splashing and excessive surface turbulence are substantially eliminated.

The apparatus of the invention comprises a tank containing a body of liquid therein having a level and an agitator extending downwardly into said liquid and rotatable about a vertical axis. The agitator comprises an inverted frusto-conical hollow shell, a boss at the lower periphery of said shell and agitator arms secured in circumferential series tangentially to said boss and extending from said boss to the level of said liquid at an angle to the horizontal in circumferentially spaced positions about said shell with their upper edges secured to the under surface of the shell and at a slight angle to a radius extending from the axis of said shell to the arm. Each arm has an arm extending from its upper end horizontally outwardly from said shell with a horizontal upper edge at approximately the level of the liquid in said tank and with a lower edge extending horizontally below said liquid level. In addition, each horizontally extending arm has a deflector extending from its upper edge substantially horizontally in the direction of rotation of the shell, each deflector being horizontally spaced from the next deflector. The shell is mounted on a rotatable, vertical, spindle so that it is rotated in such manner as to cause liquid to flow upwardly on the undersurface of the shell to the outwardly extending arms and to be propelled in a flat trajectory, being confined from an upper trajectory by the deflectors.

Figure 3:
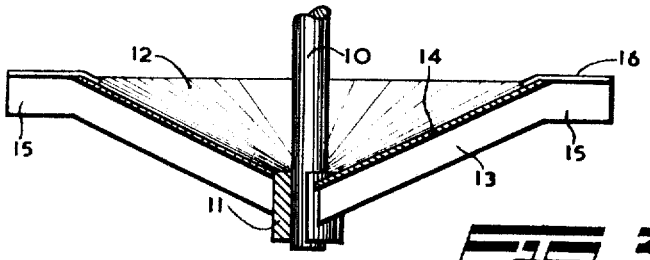
Figure 2:
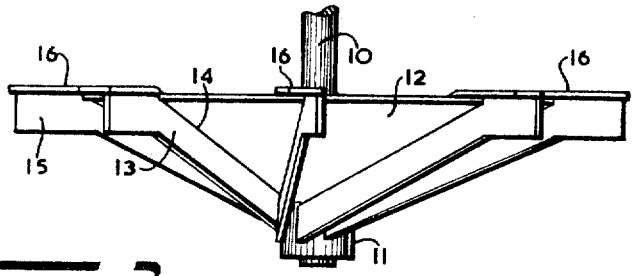
Figure 1:
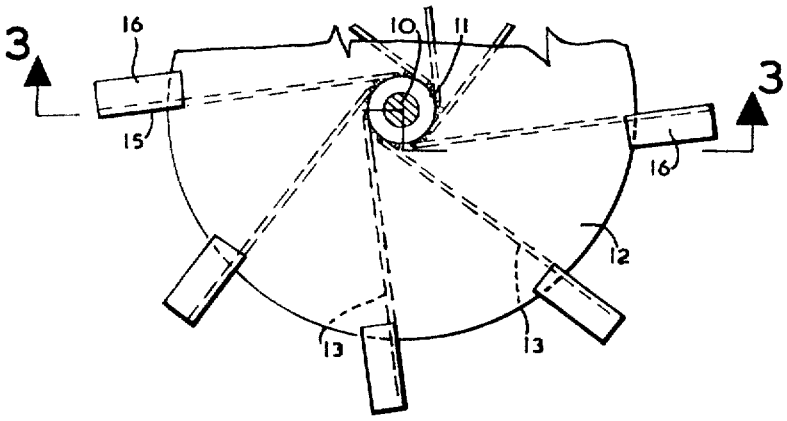
Figure 4:
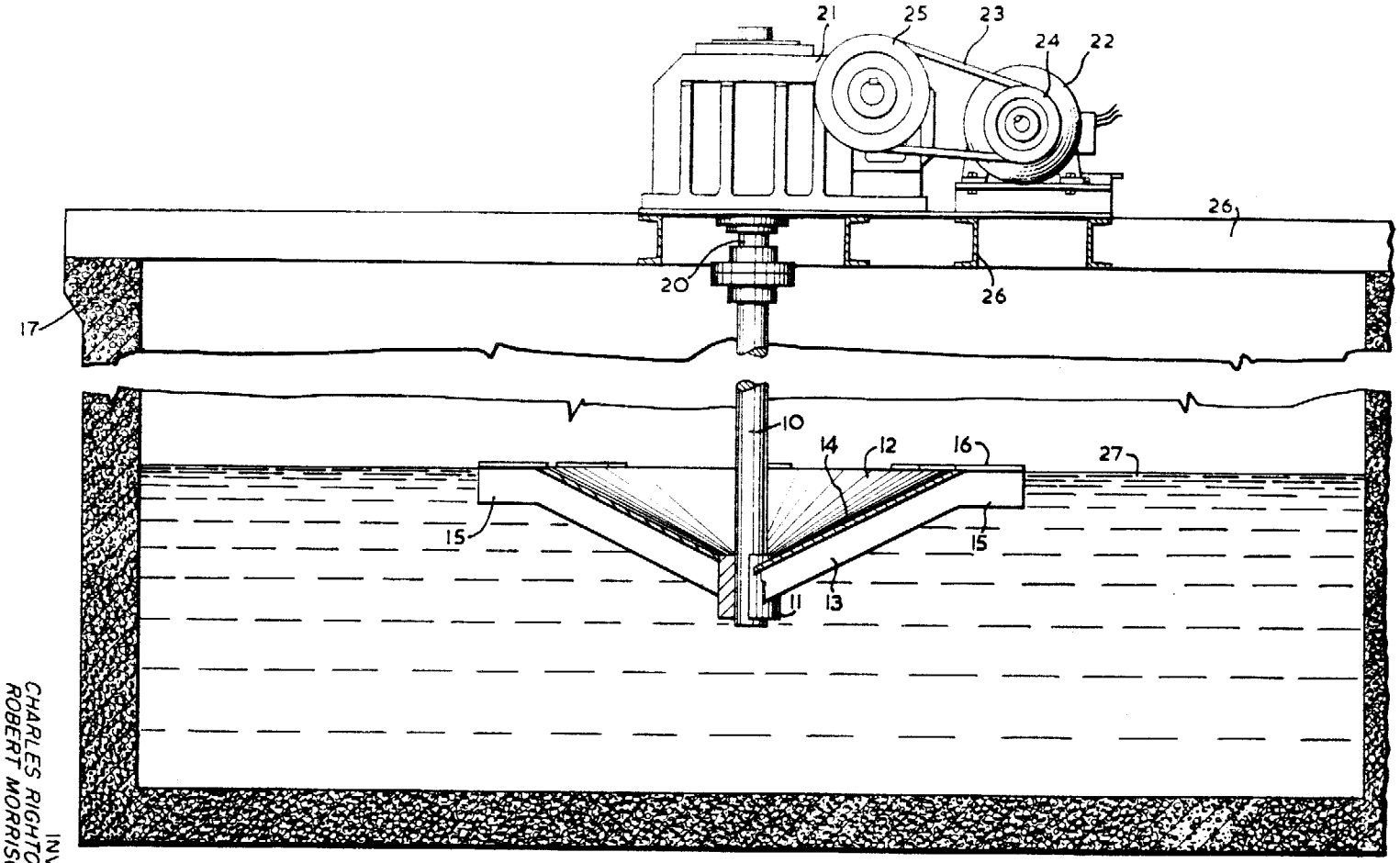

But a better understanding of the invention may be obtained from the following description when this is read with reference to the accompany drawings of which:

FIGURE 1 is a top plan view of a portion of an aerator according to one form of the invention, FIGURE 2 is a side elevation of FIGURE 1, FIGURE 3 is a section on the line 3—3 of FIGURE 1, and FIGURE 4 is a further section on the line 3—3 of FIGURE 1 but showing a driving means for the aerator with a liquid container also shown in vertical section.

In one form of the invention, as shown in the drawings, the agitator or impeller comprises a spindle 10 having secured at one end thereof an annular boss 11. A shallow metal inverted frusto-conical shell 12 has its inner periphery secured to the upper end of the annular boss 11 with its outer periphery directed upwardly away therefrom.

A plurality, say six or eight, of arms 13 are secured tangentially to the periphery of the boss 11 at such an upwardly-directed angle that their upper edges 14 follow the contour of the outer surface of the frusto-conical shell 12, to which they are also secured. As shown in the drawings, the arms are preferably of thin, flat, metal strips, secured at their lower ends to the boss with their flat face to the boss 11 and at their upper edges to the shell and form a circumferential series of arms extending at an angle to the horizontal to the surface of the liquid to be aerated, which is preferably at or near the upper edge of the shell. As shown in FIGS. 1 and 2, the arms are at a slight angle to radii from the axis of the shell. At the upper end of each arm 13, is an arm extending as shown at 15 in FIGS. 1, 2 and 4, horizontally outwardly from the shell with its horizontal upper edge at the surface of the liquid being aerated and its lower edge also horizontal and submerged in the liquid.

Each horizontally extending arm has an individual deflector 16 extending from the horizontal upper edge of the horizontal extending arm forwardly in the direction of rotation of the shell and from the surface of the shell outwardly to the end of the arm. Each deflector may be a flat plate so positioned with relation to the surface of the liquid as to confine the liquid being propelled upwardly and outwardly by the arms to a low trajectory.

As no attachment is required beneath the liquid level of the storage tank or other container 17, the present agitator or impeller, when supplied with suitable rotating means, can be applied to any liquid container 17 of suitable size and so can be used as a portable agitator for selective use in any desired one of a plurality of such containers. It may, however, if desired, be made an integral part of a liquid tank or other container, and in such an event the upper end of the spindle 10 is secured to the output shaft 20 of a vertical shaft reduction gear box 21 which is driven by an electric motor 22 through a belt drive 23 and pulleys 24, 25. The motor 22 and gear box 21 are secured above the container on a girder structure 26.

In either event, the agitator is inserted in the liquid so that the upper peripheral edge of the conical shell 12 and the deflectors 16 lie at, or slightly above, the level 27 of the liquid in the tank or other container 17.

In operation the agitator is rotated at speeds preferably between 30 and 300 r.p.m. Due to the tangential aspect of the arms 13 relative to the annular boss 11, and the upward angle of the lower surface of the cone 12, liquid is drawn upwards and outwards along the lower surface of the cone 12; the deflectors 16 preventing the liquid from being thrown upwards in a high trajectory.

During rotation, the flow of liquid is upwards and outwards from the centre of the tank or other container 17 towards its upper outer edge so that a substantially toroidal liquid circulation develops and the whole of the liquid is progressively circulated through the air in the zone of slight turbulence at the surface thereof.

Although not in any way limited to such use, the invention is particularly adapted for the aeration of effluent liquor in the bacterial effluent treatment plant of our British Patent No. 847,640.

What we claim is:

1. Apparatus for the aeration of liquids which comprises a tank containing a body of liquid therein having a level, an agitator located in said tank for the aeration of said liquid, said agitator comprising a shell having a boss and a shell wall of substantially inverted conical curvature converging downwardly to said boss, arms having flat faces secured tangentially in circumferential succession to said boss and extending from said boss to the liquid level at an angle to the horizontal in circumferentially spaced positions about said shell with their upper edges secured to the under surface of said shell and at a slight angle to a radius extending from the axis of said shell to the arm, each said arm having an arm extending from its upper end horizontally outwardly from said shell with a horizontal upper edge at approximately said liquid level and with a lower edge extending horizontally below said liquid level, each horizontally extending arm having a deflector extending from its upper edge substantially horizontally in the direction of rotation of said shell, each deflector being horizontally spaced from the next deflector.

2. The apparatus of claim 1 in which said boss is annular and co-axial with the axis of curvature of said shell wall.

3. The apparatus of claim 1 in which the upper edges of the horizontally extending arms are approximately in the same plane as the upper edge of the shell wall and said deflectors are flat plates mounted on the upper edges of said horizontally extending arms and extend from one side of said horizontally extending arms and at a right angle to the sides of said horizontally extending arms.

4. The apparatus of claim 1 which comprises a supporting spindle for said shell secured to said boss and extending upwardly within said shell and co-axially with the axis of said shell.

*5. Apparatus for the aeration of liquids which comprises surface means defining a space adapted to receive a body of liquid having a level, an agitator located in said space for the aeration of said liquid, said agitator comprising a shell defining a central circular locality and having a shell wall of substantially inverted conical curvature converging downwardly to said locality, arms having flat faces lying in planes which planes extend tangentially in circumferential succession to said locality and said arms extending along said shell to the liquid level at an angle to the horizontal in circumferentially spaced positions about said shell with their upper edges secured to the under surface of said shell and at a slight angle to a radius extending from the axis of said shell to the arm, each said arm having an arm extending from its upper end horizontally outwardly from said shell with a horizontal upper edge at approximately said liquid level and with a lower edge extending horizontally below said liquid level, each horizontally extending arm having a deflector extending from its upper edge substantially horizontally in the direction of rotation of said shell, each deflector being horizontally spaced from the next deflector.*

*6. The apparatus of claim 5 in which the upper edges of the horizontally extending arms are approximately in the same plane as the upper edge of the shell wall and said deflectors are flat plates mounted on the upper edges of said horizontally extending arms and extend from one side of said horizontally extending arms and at a right angle to the sides of said horizontally extending arms.*

*7. The apparatus defined in claim 5 wherein said surface means comprises a tank.*

*8. Apparatus for the aeration of liquids which comprises surface means defining a spaced adapted to receive a body of liquid therein having a level, an agitator located in said space for the aeration of said liquid, said agitator comprising a shell defining a central circular locality and having a shell wall coverging downwardly to said locality, arms having flat faces lying in planes which planes extend tangentially in circumferential succession to said locality and said arms extending along said shell to the liquid level at an angle to the horizontal in circumferentially spaced positions about said shell with their upper edges secured to the under surface of said shell and at a slight angle to a radius extending from the axis of said shell to the arm, each said arm having an arm extending from its upper end horizontally outwardly from said shell with a horizontal upper edge at approximately said liquid level and with a lower edge extending horizontally below said liquid level, each horizontally extending arm having a deflector extending from its upper edge substantially horizontally in the direction of rotation of said shell, each deflector being horizontally spaced from the next deflector.*

*9. The apparatus of claim 8 in which the upper edges of the horizontally extending arms are approximately in the same plane as the upper edge of the shell wall and said deflectors are flat plates mounted on the upper edges of said horizontally extending arms and extend from one side of said horizontally extending arms and at a right angle to the sides of said horizontally extending arms.*

References Cited by the Examiner

The following references, cited by the Examiner, are of record in the patented file of this patent or the original patent.

UNITED STATES PATENTS

| | | | |
|---|---|---|---|
| 421,729 | 2/1890 | Kisinger | 239—224 |
| 718,557 | 1/1903 | Wenzel | 103—88 |
| 2,319,402 | 5/1943 | Heuer | 259—107 |
| 2,319,752 | 5/1943 | Smith et al. | |
| 2,796,241 | 6/1957 | Lhota | 261—91 |
| 2,802,647 | 8/1957 | Bolton | 261—84 |

FOREIGN PATENTS

| | | |
|---|---|---|
| 119,667 | 11/1930 | Austria. |
| 626,576 | 8/1961 | Canada. |
| 1,205,301 | 8/1959 | France. |
| 470,873 | 8/1937 | Great Britain. |

WALTER A. SCHEEL, *Primary Examiner.*

H. MARTIN, R. W. JENKINS, D. M. RIESS, S. S. HUSTING, *Assistant Examiners.*